(12) United States Patent
Jafarkhani et al.

(10) Patent No.: US 7,539,458 B2
(45) Date of Patent: May 26, 2009

(54) APPARATUS AND METHOD FOR A SYSTEM ARCHITECTURE FOR MULTIPLE ANTENNA WIRELESS COMMUNICATION SYSTEMS USING ROUND ROBIN CHANNEL ESTIMATION AND TRANSMIT BEAM FORMING ALGORITHMS

(75) Inventors: Hamid Jafarkhani, Irvine, CA (US); Li Liu, Aliso Viejo, CA (US)

(73) Assignee: The Regents of the University of California, Oakland, CA (US)

( * ) Notice: Subject to any disclaimer, the term of this patent is extended or adjusted under 35 U.S.C. 154(b) by 173 days.

(21) Appl. No.: 11/584,831

(22) Filed: Oct. 23, 2006

(65) Prior Publication Data

US 2007/0093274 A1    Apr. 26, 2007

Related U.S. Application Data

(60) Provisional application No. 60/730,181, filed on Oct. 24, 2005.

(51) Int. Cl.
*H04B 1/00*      (2006.01)
*H04B 15/00*     (2006.01)

(52) U.S. Cl. .............. 455/63.1; 455/67.11; 455/67.16; 455/69; 455/91; 343/368; 343/754; 343/753

(58) Field of Classification Search .......... 455/63.1, 455/67.11, 67.16, 69, 91, 115.1; 343/754, 343/368, 753
See application file for complete search history.

(56) References Cited

U.S. PATENT DOCUMENTS

| | | | | |
|---|---|---|---|---|
| 6,246,364 | B1 * | 6/2001 | Rao et al. | 342/368 |
| 7,443,925 | B2 * | 10/2008 | Mehta et al. | 375/299 |
| 2002/0054621 | A1 * | 5/2002 | Kyeong et al. | 375/147 |
| 2004/0002364 | A1 * | 1/2004 | Trikkonen et al. | 455/562.1 |
| 2005/0113116 | A1 * | 5/2005 | Avidor et al. | 455/456.5 |
| 2005/0219118 | A1 * | 10/2005 | Kubo et al. | 342/174 |
| 2006/0014511 | A1 * | 1/2006 | Ghassemzadeh et al. | 455/277.1 |
| 2006/0256024 | A1 * | 11/2006 | Collinson | 343/770 |

* cited by examiner

*Primary Examiner*—Tuan A Pham
(74) *Attorney, Agent, or Firm*—Marcus C. Dawes; Daniel L. Dawes (57) ABSTRACT

A multiple antenna wireless system including a transmitter and a receiver comprises a reconfigurable large antenna array having a plurality of antennas. A plurality of RF chains in the transmitter is coupled to the reconfigurable large antenna array. A pilot assisted round robin channel estimation means tracks the fading channel; and an adaptive round robin transmit beamforming means beam forms the reconfigurable large antenna array. A method for multiple antenna wireless communication comprising the steps of tracking a plurality of fading channels in a reconfigurable large antenna array having a plurality of antennas using pilot assisted round robin channel estimation to selectively couple a plurality of RF chains in the transmitter to the reconfigurable large antenna array, and adaptively, round-robin transmit beamforming the reconfigurable large antenna array.

11 Claims, 5 Drawing Sheets

APPARATUS AND METHOD FOR A SYSTEM ARCHITECTURE FOR MULTIPLE ANTENNA WIRELESS COMMUNICATION SYSTEMS USING ROUND ROBIN CHANNEL ESTIMATION AND TRANSMIT BEAM FORMING ALGORITHMS

RELATED APPLICATIONS

The present application is related to U.S. Provisional Patent Application, Ser. No. 60/730,181, filed on Oct. 24, 2005, which is incorporated herein by reference and to which priority is claimed pursuant to 35 USC 119.

GOVERNMENT RIGHTS

This invention is supported in part by the Contract ECS-0424454 from the National Science Foundation. The U.S. Government has certain rights.

BACKGROUND OF THE INVENTION

1. Field of the Invention

The invention relates to the field of wireless communications in which channel estimation and transmit beam forming occurs in a reconfigurable antenna array.

2. Description of the Prior Art

Many space-time transmission schemes have been proposed recently to exploit the high channel capacity from the MIMO communication systems. However, algorithms for a large antenna array (LAA) remain an open research problem. The standard channel estimation and space-time modulation schemes are not practical for LAAs due to high implementation complexity.

Channel estimation for MIMO wireless channels is well known as disclosed in D. Samardzija and N. Mandayam, "Pilot-assisted estimation of mimo fading channel response and achievable data rates," IEEE Trans. Signal Processing, vol. 51, no. 11, pp 2882-2890, November, 2003. Further, transmit beam forming for MIMO wireless channels is described in Hottinen, O. Tirkkonen, and R. Wichman, Multi-antenna transceiver techniques for 3G and beyond, New York: Wiley, 2003. The inventors have also published the general idea of adapting the communication system to reconfigurable antennas as disclosed in B. A. Cetiner, H. Jafarkhani, J.-Y. Qian, H. J. Yoo, A. Grau, and F. De Flaviis, "Multifunctional Reconfigurable MEMS Integrated Antennas for Adaptive MIMO Systems," *IEEE Communications Magazine,* December 2004.

Multiple-input multiple-output (MIMO) systems offer much larger channel capacity over traditional single-input single-output (SISO) systems. Usually, it is easy to mount multiple antennas at the base station instead of the mobile station since there are less space and power restriction. Thus, the embodiment of a multiple-input single-output system (MISO) is of special interest for high-rate downlink wireless communications.

Recently, many open loop and close loop algorithms have been developed for MISO systems. The open loop algorithms are based on space-time coding (STC) and no channel state information (CSI) is required at the transmitter. The close loop algorithms are normally referred to as transmit beamforming and they require channel state information at the base station. Usually, the channel state information can be sent back from the mobile station to the base station through a feedback channel. In the traditional MISO system, the channel capacity increases with the number of transmit antennas. However, each transmit antenna requires a dedicated RF chain which consists of analog front end, mixer, and power amplifier. As the number of transmit antennas increases, so do the cost and the power consumption of the transmitting unit at the base station. Moreover, for the purpose of coherent detection, the receiver needs to keep track of the multi-path fading channels between each transmit antenna and the receive antenna. The continuous channel estimation will consume a significant amount of power and processing resource on the mobile station. Since the portable mobile station has a strict power and cost concern, the real time channel estimation at the mobile station becomes a prohibitive task when the number of transmit antennas is large.

In addition, to implement transmit beamforming algorithms for a large number of transmit antennas, the mobile station needs to manage a large amount of channel state information feedback, which also increases the mobile station complexity.

Therefore what is needed is some type of system or method of communication which employs a low-cost low-complexity transmitter architecture that enjoys superior performance as well as simple implementation.

BRIEF SUMMARY OF THE INVENTION

The disclosed system architecture is intended for multiple antenna wireless systems. This disclosed architecture enables a simple low cost transmitter and receiver design for practical wireless communication devices. In this disclosure, we describe a novel transmit beamforming scheme based on a reconfigurable large antenna array (LAA). Compared to the conventional schemes, our scheme requires a much smaller number of RF chains, yet it still enjoys the high performance offered from the LAA. Based on a reconfigurable LAA, we present a pilot assisted round robin channel estimation algorithm. With this estimation algorithm, the tracking of the fading channel is significantly simplified at the mobile station. We then introduce an adaptive transmit beamforming algorithm based on relative channel phase feedback at the transmitter. For a time varying Rayleigh fading channel, we investigate the system signal-to-noise ratio (SNR) as a function of the latency of the round robin channel estimation and derive the optimal training duration for given mobile speed. Finally, numerical simulations show that the proposed scheme accomplishes superior performance for various kinds of time varying Rayleigh fading channels. Overall, the proposed system enjoys good performance, high flexibility, low cost as well as low power consumption at both the base station and mobile station.

One of the differences between the illustrated embodiment of the present invention and the prior art is that we address the channel estimation and transmit beam forming problems for a reconfigurable antenna array, whereas the prior art is all based on a fixed antenna array. Our reconfigurable antenna array is based on a design and architecture, which has never been seen in any prior art.

In addition, our channel estimation and transmit beam forming algorithms are carried out in a round-robin manner whereas the algorithms in the prior art use a parallel approach.

We have solved several important problems:

a. Flexible design: The illustrated embodiment of the system works for both open-loop and closed-loop wireless systems.

b. Simple transmitter design: The illustrated embodiment of the system architecture uses only a small amount of RF chains at the transmitter. Thus the cost, power consumption, implementation complexity of the transmitter is reduced.

c. Efficient receiver design: At any given time, the receiver only needs to estimate the channel path gain from one particular transmit antenna. Therefore, the channel estimation task is significantly simplified at the receiver. As a result, the receiver enjoys much longer battery life.

d. High performance: The illustrated embodiment of the system uses a large number of transmit antennas to realize superior performance in terms of SNR, bit error rate and channel capacity.

More particularly the illustrated embodiment of the invention is a multiple antenna wireless system including a transmitter and a receiver. The system comprises a reconfigurable large antenna array having a plurality of antennas; a plurality of RF chains in the transmitter coupled to the reconfigurable large antenna array; a pilot assisted channel estimation means for tracking of a fading channel; and an adaptive transmit beamforming means at the transmitter for beamforming the reconfigurable large antenna array.

In the illustrated embodiment the channel estimation means performs tracking of a fading channel and transmit beamforming means performs beam forming the reconfigurable large antenna array in a round-robin manner.

The pilot assisted round robin channel estimation means and the adaptive transmit beamforming means operate at an optimal training duration for a given mobile speed of the receiver.

The plurality of RF chains are divided into two groups during training, which may be performed continuously or according to any other protocol desired or found advantageous. A first group of the RF chains is employed to drive a first group of antennas in the large antenna array for normal data transmissions, and a different RF chain or RF chains not included in the first group is employed to transmit a pilot training sequence on one of the plurality of antennas to be trained, which is also not included in the first group during training. The second group of the RF chains is preferably comprised of single RF chain. The second group of the RF chains transmit a pilot training sequence on corresponding other one of the plurality of antennas in a round robin fashion. Preferably each antenna will have a separate gain path and will be separately trained. In the event that a particular application might cause more than one antenna or antenna element to have the same or approximately similar gain paths, then these related antennas could be combined and trained as if there were unitary.

In one embodiment the receiver measures performance of the fading channel, generates relative channel phase information, and feeds back the relative channel phase information to the transmitter. The system further comprises a plurality of RF phase shifters coupled to the large antenna array. The RF phase shifters are selectively and separately adjusted to perform co-phase transmission (CPT) using the relative channel phase information fed back from the receiver. Conventional co-phase transmission may be employed.

The system further comprises a plurality of RF switches for selectively coupling either a data signal to be transmitted or a piloting training signal to be transmitted to each of the antennas in the large antenna array.

The system further comprises a plurality of impedance matching circuits selectively coupled to each of the antennas in the large antenna array to provide impedance matching as different RF chains are selectively coupled to the antennas.

In the embodiment where the system is operated in an open loop mode, there is no channel state information available at the transmitter, and the receiver generates STCs to provide spatial diversity to compensate for channel fading. The RF switches are configured into a predetermined corresponding position for each RF chain and all of the phase shifters are configured into a fixed position so that all antennas coupled to RF chains driven in parallel operate as a single combined antenna with respect to channel path gain.

In the embodiment where the system is operated in a closed loop mode, there is channel state information available at the transmitter from the receiver, and the phase shifters coupled to each RF chain are adaptively configured in a round robin fashion in that the RF switches are reconfigured such that a pilot training sequence is directed to a selected one of the antennas in the large antenna array in sequence until the corresponding channels for each of the antennas has been trained. The receiver calculates two effective channel path gains for each antenna without interrupting ongoing data communication and feeds back channel phase information to the transmitter to reconfigure the phase shifter corresponding to the antenna being trained.

In one embodiment the system comprises a baseband modulator coupled in sequence to each of the antennas of the large antenna array to provide a pilot training signal in sequence to each antenna as controlled by a selected configuration of the plurality of RF switches with the other ones of the antennas being coupled to a data signal. The receiver generates relative channel phase information between the antenna being trained and a first antenna trained. The receiver sends the relative channel phase information back to the transmitter for each antenna as it is trained. The phase shifter corresponding to the trained antenna is adjusted to attain maximum signal-to-noise ration (SNR) at the trained antenna.

The pilot assisted round robin channel estimation means comprises means for separately estimating the channel path gain from each antenna of the large antenna array.

The round robin channel estimation means and transmit beam forming means adaptively adjusts each antenna in the large antenna array such that the transmitted signal better or optimally fits the channel reality.

The illustrated embodiment of the invention is also characterized as a method for multiple antenna wireless communication comprising the steps of tracking a plurality of fading channels in a reconfigurable large antenna array having a plurality of antennas using pilot assisted round robin channel estimation to selectively couple a plurality of RF chains in the transmitter to the reconfigurable large antenna array, and adaptively, round-robin transmit beamforming the reconfigurable large antenna array.

The step of tracking of the fading channels and transmit beamforming are performed in a round-robin manner.

The step of tracking of the fading channels and transmit beamforming are performed at an optimal training duration for a given mobile speed of the receiver.

The step of tracking of the fading channels comprises driving a selected group of antennas in the large antenna array for normal data transmissions with a selected group of the RF chains, and transmitting a pilot training sequence on a different antenna and RF chain not included within the selected groups of antennas and RF chains.

The step of adaptively, round-robin transmit beamforming comprises measuring performance of the fading channel, generating relative channel phase information, and feeding back the relative channel phase information, adjusting a plurality of RF phase shifters coupled to the large antenna array to perform co-phase transmission (CPT) using the relative channel phase information fed back.

The method further comprises the step of providing impedance matching as different RF chains are selectively coupled to the antennas.

The step of adaptively, round-robin transmit beamforming the reconfigurable large antenna array comprises transmit beamforming in an open loop mode where there is no channel state information available using STCs to provide spatial diversity to compensate for channel fading, where all but one of the antennas are coupled to a corresponding RF chain and operate as a single combined antenna with respect to channel path gain, the one antenna operating to track the plurality of fading channels. Conventional STCs may be employed in this step.

In the embodiment where the system is operated in a closed loop mode, and there is channel state information available, the step of adaptively, round-robin transmit beamforming comprises directing a pilot training signal to a selected one of the antennas in the large antenna array in sequence until the corresponding channels for each of the antennas has been trained in a round robin fashion, and feeding back channel phase information to reconfigure the corresponding antenna being trained in a round robin fashion.

In the embodiment where the system is operated in a closed loop mode, the step of adaptively, round-robin transmit beamforming comprises coupling a baseband modulator coupled in sequence to each of the antennas of the large antenna array to provide the pilot training signal in sequence to each antenna as controlled by a selected configuration of a plurality of RF switches with the other ones of the antennas being coupled to a data signal, generating relative channel phase information between the antenna being trained and a first antenna trained, sending the relative channel phase information back for each antenna as it is trained, adjusting a phase shifter corresponding to the trained antenna to attain maximum signal-to-noise ration (SNR) at the trained antenna.

The step of tracking a plurality of fading channels comprises separately estimating the channel path gain from each antenna of the large antenna array.

The step of adaptively, round-robin transmit beamforming the reconfigurable large antenna array comprises adaptively adjusting each antenna in the large antenna array such that the transmitted signal better or optimally fits the channel reality.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

In the illustrated embodiment we use an adaptive transmit beamforming scheme. In the illustrated embodiment of FIG. 1, only a small number of RF chains 10 are implemented at the transmitter or large antenna array 12. These RF chains 10 are divided into two groups. The first group is employed to drive all the transmit antennas 14 for normal data transmissions, while the next group has only one RF chain and it is used to transmit pilot training sequence on certain "selected" transmit antennas 14. The pilot sequence is transmitted by different ones of the selected antennas 14 in a round-robin fashion. At any time, the receiver (not shown) only needs to estimate a few channel path gains without interrupting the ongoing data communications. As the receiver gathers enough knowledge of the channel, it sends back the relative channel phase information to the transmitter 12. On the transmitter side, the RF phase shifters 18 in the LAA are adjusted to perform a standard co-phase transmission (CPT) using the channel phase feedback.

Figure 1:
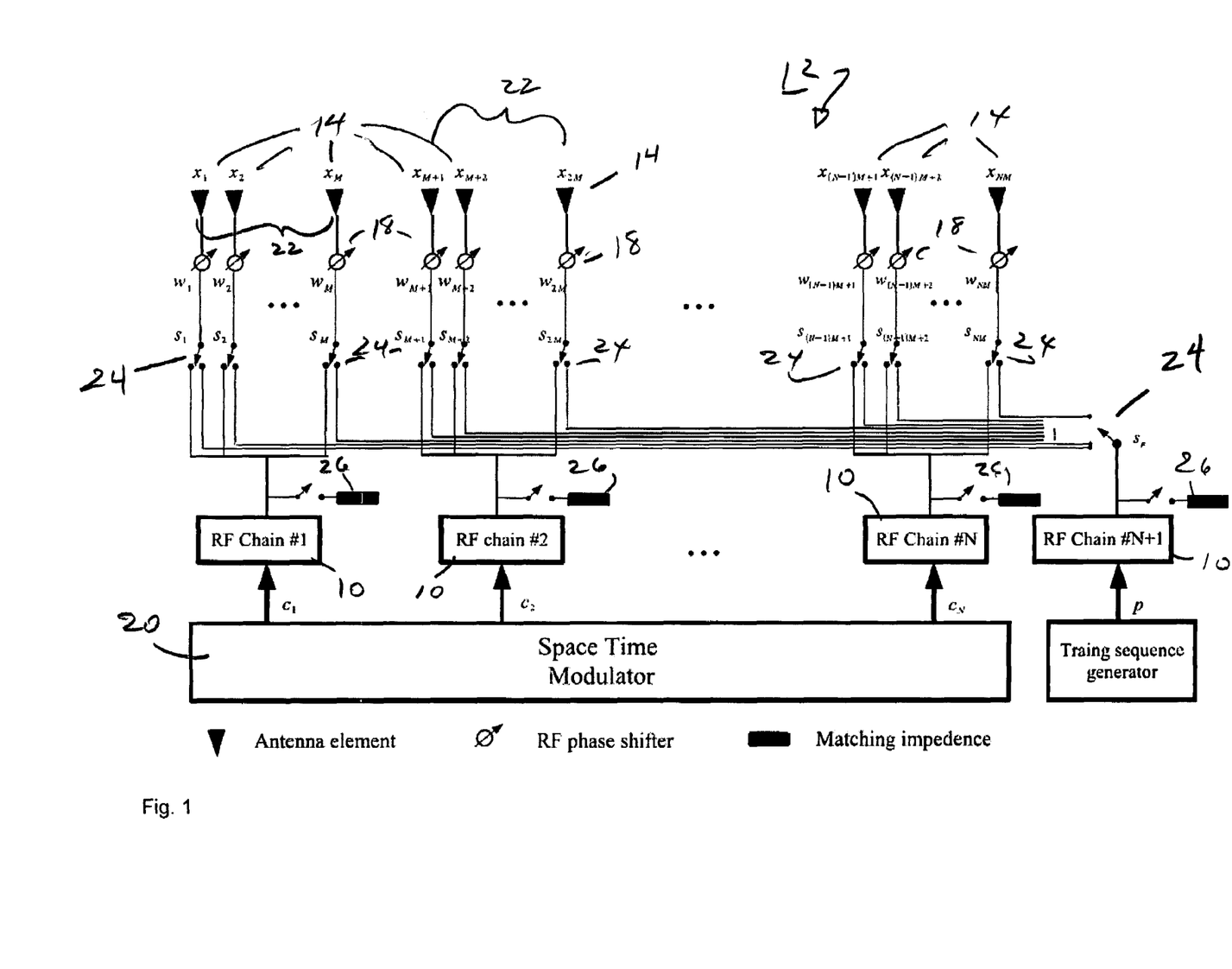
FIG. 1 is a block diagram of the reconfigurable transmit antenna array system of the invention.

Based on the reconfigurable array structure of FIG. 1, our architecture enjoys simple channel estimation as well as simple feedback management. To evaluate the performance of the proposed adaptive beamforming algorithm in a time selective fading environment, we calculate the system SNR as a function of the duration of the estimation algorithm. Based on the SNR analysis, we determine the optimal training period for the round robin algorithm. Since the proposed algorithm takes the time-varying nature of the fading channel into consideration, our proposed algorithm is suitable for a wide variety of practical wireless communication scenarios. Overall, the proposed scheme enjoys superior performance, high flexibility and low cost as well as low power consumption.

We shall first describe the detailed system block diagram of FIG. 1 for the transmitter designs. We then describe the channel estimation algorithm based on the system architecture. We present a system SNR analysis for a time varying Rayleigh fading channel. Finally, we present some simulation results and the conclusions.

Note that bold uppercase (lowercase) letters denote matrices (column vectors); $(\bullet)^*$; $(\bullet)^T$; $(\bullet)_H$ denote conjugate, transpose, and Hermitian, respectively; $[X]_{ij}$ denotes the element at the ith row and jth column of X; $\angle(x)$ denotes the angle of a complex variable x; $p(\bullet); E(\bullet); cov(\bullet)$ stands for the probability density function (pdf), mean and covariance of a random variable, respectively; $N(x; y^2)$ denotes a Gaussian random variable with mean x and variance $y^2$; $\Gamma(\bullet)$; $J_0(\bullet)$ denote the Gamma function and zero-th order Bessel function of the first kind, respectively; $\delta_{ij}$ denotes the discrete Dirac function, i.e. $\delta_{ii}=1$ and $\delta_{ij}=0$ for $i \neq j$.

Turn now and consider the system block diagram of FIG. 1 of the reconfigurable transmit antenna array 12 in greater detail. In the proposed system, the space-time modulator 20 generates N parallel data streams $c_i$; i=1; ...;N, according to conventional communication methods and each data stream drives a corresponding dedicated RF chain 10. To maintain low system cost and low power consumption, N is set to be a very small number (N≦3), although the scope of the invention contemplates that any value could be employed. The output from each RF chain 10 drives a RF phase shifted array (PSA) 22. Each PSA 22 is comprised of a group of M transmit antennas 14 and M RF phase shifters 18. A selectively controllable phase shifter 18 is coupled in circuit to each corresponding one of the antennas 14. Each phase shifter 18 can be configured into one of the $2^G$ different phase delays, i.e, $w_j = \exp(2\Pi gj/2^G)$; g=0, ..., $2^G-1$; and j=1, ..., NM. Altogether, there are NM transmit antennas 14 in transmitter or LAA system 12. In the illustrated embodiment, we assume that the transmit antennas 14 are spaced far apart such that they all experience independent channel fading. The parameter M can be a very large number since phase shifters 18 and antennas 14 are low cost and power efficient components. Overall, the proposed LAA system 12 enjoys low system cost and high power efficiency.

In FIG. 1, each antenna 14 can also be driven by another independent source of signal, which is defined as training sequence p. The RF switches 24, $s_i$; i=1, ..., NM and sp, are used to select the input source for each transmit antenna 14. Due to the functionality of these switches 24, the system 12 is a reconfigurable LAA. Impedance matching circuits 26 for each RF chain 10 are selectively adjusted and switched in circuit depending on the set of antennas 14 that are coupled to RF chains 10 to provide transmitter to antenna impedance matching at all times as different RF chains 10 are coupled to the antennas 14, i.e. the data signals or the pilot training signals.

Consider now the configuration of the LAA system 12 for the different modes of operation. Turn first to the open loop mode. In this mode, there is no channel state information available at the transmitter 12. The standard STCs are employed to provide spatial diversity to combat channel fading. In the open loop mode, the RF switches 24 are configured as $s_{(n-1)M+m} = c_n$ for n=1, ..., N-1 where m=1, ..., M, $s_{(N-1)M+m} = c_N$ for m=1, ..., M-1, and $s_{NM} = p$. Since there is no channel state information at the transmitter 12, the phase shifters $w_i$; i=1, ..., NM are configured into fixed positions, i.e., $w_i = 1$; for all i.

Figure 2:
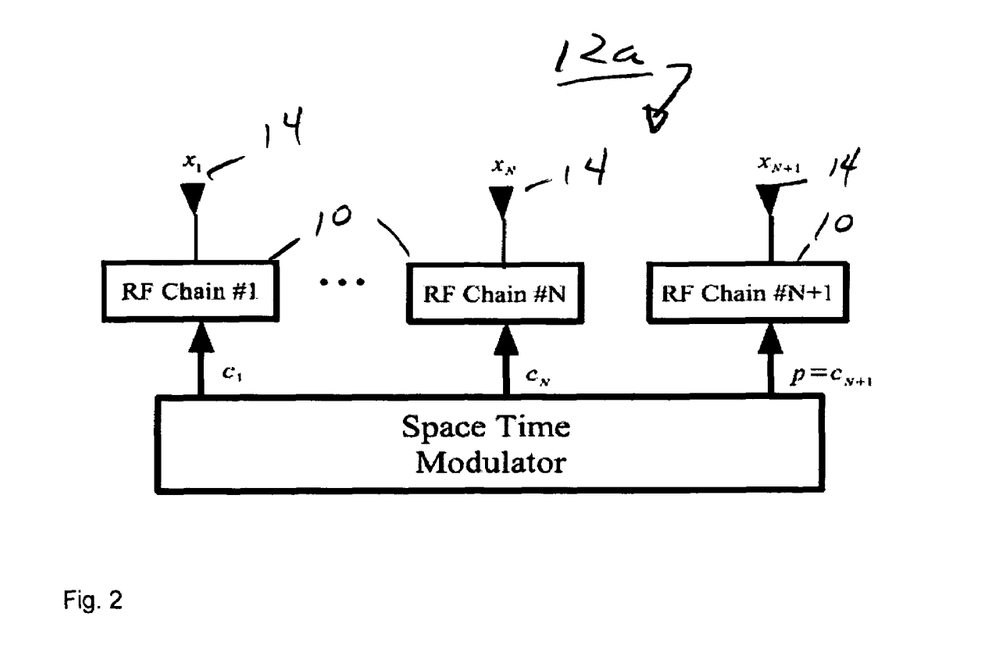
FIG. 2 is a diagram of an equivalent transmitter of the system of FIG. 1 with a setting for open loop mode.

For the open loop mode, the equivalent transmitter 12a setting is depicted in FIG. 2. In this mode of operation, the N+1 RF chains 10 drive the NM transmit antennas 14. Since the M transmit antennas in each PSA 22 are driven by the same signal source, these M transmit antennas behave or operate like a single "combined" antenna. Based on the additive MIMO channel model described in A. Hottinen, O. Tirkkonen, and R. Wichman, Multi-antenna transceiver techniques for 3G and beyond, New York: Wiley, 2003, the equivalent channel path gain for the "combined" antenna is $$\hat{h}_n = \frac{1}{\sqrt{M}} \sum_{m=(n-1)M+1}^{nM} h_m$$

where $\hat{h}_n$; n=1, ..., N is the path gain for the "combined" antenna of the nth PSA 22, and $h_m$; m=1, ..., NM is the channel path gain from the $m^{th}$ transmit antenna 14 to the receive antenna. The term $$\frac{1}{\sqrt{M}}$$

is introduced here due to the simple fact that the transmit power from each RF chain 10 is evenly distributed on the M transmit antennas 14 in the PSA 22. Based on this fixed configuration, the system behaves like a MISO system with N+1 transmit antennas 14. This is why there are only N+1 transmit antennas in the equivalent transmitter model in FIG. 2.

Note that the last RF chain 10 that generates signal p can be considered as one transmit antenna 14 as well, in which case, the signal p carries both training and data symbols. The conventional space-time block codes (STBCs) or space-time trellis codes (STTCs) for N+1 transmit antennas 14 can be readily adopted for this mode of operation. For example, the orthogonal codes described in S. Alamouti, "A simple transmit diversity scheme for wireless communications," IEEE J. Select. Areas Commun., vol. 16, no. 8, pp. 1451-1458, October 1998 and in V. Tarokh, H. Jafarkhani, and A. Calderbank, "Space-time block codes from orthogonal designs," IEEE Trans. Inform. Theory, vol. 45, no. 5, pp. 1456-1467, July 1999 is suitable for the N≦2 case, and the quasi-orthogonal STBC described in H. Jafarkhani, "A quasi-orthogonal space-time block code," IEEE Trans. Commun., vol. 49, no. 1, pp. 1-4, January 2001 is suitable for the N=3 case. In addition, the N+1 RF chains 10 can transmit training sequences that are mutually orthogonal to each other. Since the parameter N+1 is usually small, the continuous channel estimation is a fairly simple task which requires little power and signal processing resources at the mobile station.

Turn now and consider the closed loop mode. When there is a feedback channel conveying channel state information from the receiver to the transmitter 12, a close loop transmit beamforming algorithm provides much better error performance than the open loop algorithms. In the close loop mode of operation of the invention, the transmit beamforming is realized by adaptively configuring the phase shifters 18 in each PSA 22. However, to properly configure these phase shifters 18, the receiver needs to identify the channel path gain from each transmit antenna 14 to the receive antenna. In order to identify the channel path gain, the standard method is to transmit mutually orthogonal training sequences on the different transmit antennas 14. At the receiver, the known orthogonal training sequences can be used to perform channel estimation. For the prior art schemes, the number of RF chains 10 has to be the same as the number of transmit antennas 14. Therefore, multiple orthogonal training sequences can be simultaneously sent out. At the receiver, a maximum-likelihood (ML) channel estimator can be used to carry out the channel estimation in real time. However, this classic algorithm keeps track of a large number of fading channels in real-time, hence it requires complicated signal processing and significant amount of power consumption at the mobile station. In addition, it also results in high cost implementation at the base station, since the number of RF chains 10 must equals the number of transmit antennas 14.

In the system of the illustrated embodiment, the number of RF chains 10 is significantly reduced based on a round robin channel estimation algorithm. At each step of the training, a special pilot sequence is only transmitted on one of the antenna 14 in the LAA. Once the training is done, the RF switches 24, $s_m$; m=1, ..., NM, are reconfigured such that the special pilot sequence is redirected to the next transmit antenna 14. In a slow fading environment, it is reasonable to believe that the channel coherent time will be long enough such that all the antennas 14 will be sufficiently trained. In this way, the number of RF chains 10 is reduced.

In addition, at any given time, the mobile station only needs to calculate two effective channel path gains, and the ongoing data communication is not interrupted. At each step of the training, the receiver also sends back the latest channel phase information to the transmitter 12. Based on these feedbacks, the phase shifters 18 can be reconfigured at the transmitter 12.

Figure 3:
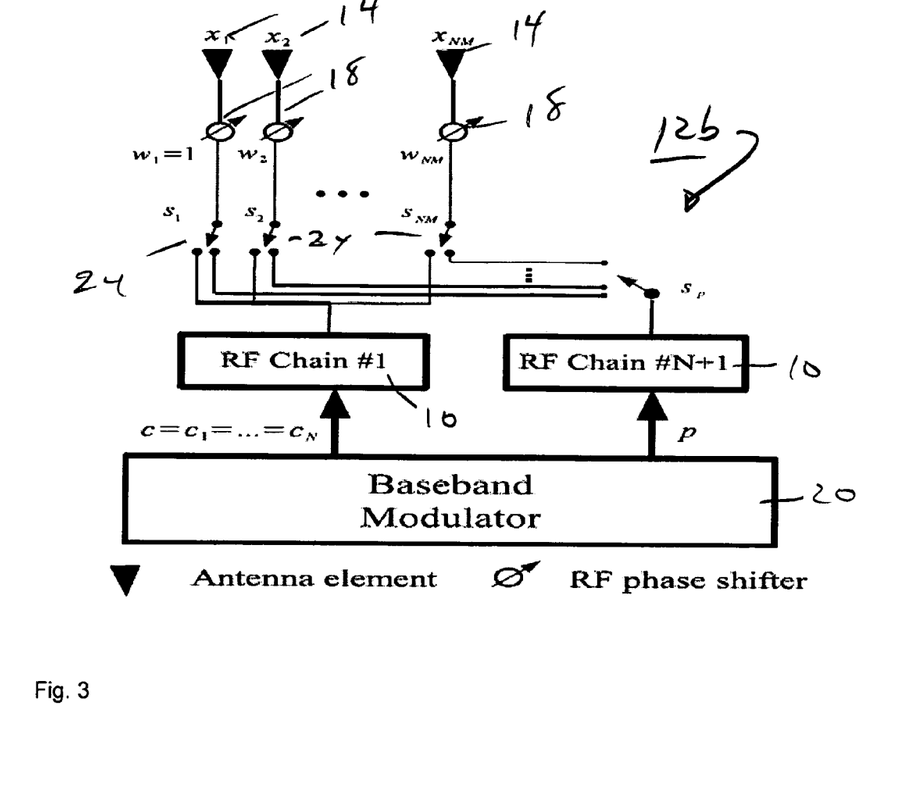
FIG. 3 is a diagram of an equivalent transmitter of the system of FIG. 1 with a setting for closed loop mode.

In summary, the LAA reconfiguration procedure is summarized as follows. The first phase shifter 18, $w_1$, is always fixed to be $w_1=1$. The space-time modulator 20 is configured such that the same signal is transmitted on the first N RF chains 10 in FIG. 1, i.e, $c=c_1=...=c_N$. Thus, the first N RF chains 10 can be modeled as a single RF chain 10. The equivalent transmitter setting 12b in the closed loop mode is depicted in FIG. 3. The training is carried out in separate steps. In each step, $L_a$ symbols are sent out from the transmitter 12b.

Step 1: The RF switches 24 are configured such that $s_1=p$, $s_m=c$; $1<m\cdot\leq NM$. After $L_a$ symbol intervals, the training on the first transmit antenna 14 is finished.

Step 2 through Step NM: At the $i^{th}$ step, $2 \cdot \leq i \cdot \leq NM$, the RF switches 24 are configured such that $s_i=p$, $s_m=c$; for $1 \cdot \leq m \cdot \leq NM$; $m \neq i$. Basically, after each $L_a$ symbol intervals, the pilot sequence p is redirected to the next transmit antenna 14. At the end of $L_a$ symbol interval, the receiver performs signal decoding based on the channel estimation result. In the meantime, the relative channel phase between the $i^{th}$ transmit antenna 14 and the first antenna 14 is quantized into G binary bits. These G bits are sent back to the transmitter 12b. At the transmitter 12b, the phase shifter 18, $w_i$, is adjusted based on these feedbacks to attain maximum SNR. After all NM antennas 14 have been estimated and all the phase shifters 18 have been reconfigured, the algorithm returns to Step 1 and restarts the training on the first antenna 14.

Turn now to the details of the round robin channel estimation algorithm. The focus of our approach is to track the channel without interrupting the ongoing data communications. In each step of the training, the $k^{th}$ transmitted symbol (out of the total $L_a$ symbols) in data sequence c and training sequence p are defined as follows $$c(k) = c_n(k) \quad (1)$$
$$= \sum_{i=1}^{L_d} A_d t_d^i p_d^i(k) + \sum_{i=1}^{L_{p1}} A_{p1} t_{p1}^i p_1^i(k), \forall n$$

and $$p(k) = \frac{1}{\sqrt{M}} \left[ \sum_{i=1}^{L_d} A_d t_d^i p_d^i(k) + \sum_{i=1}^{L_{p2}} A_{p2} t_{p2}^i p_2^i(k) \right]. \quad (2)$$

In equations (1) and (2), the first sum term represents the data bearing signal and the second sum term corresponds to the pilot training signal. The parameters $A_d$, $A_{p1}$ and $Ap_{p2}$ represent the amplitude of the data symbols and the symbols in the first and second training sequences, respectively. The parameter $t_d^i$; i=1, ..., $L_d$ represents unit-variance data bearing symbols. The parameters $t_{p1}^i$; i=1, ..., $L_{p1}$ and $t_{p2}^i$; i=1, ..., $L_{p2}$ are pilot symbols for the two training sequences respectively. These pilot symbols satisfy $/t_{p1}^i/=/t_{p2}^i/=1$ and are known at both the transmitter 12 and the receiver. The parameter $P_d^i(k)$ denotes a sample from the data signal temporal signature, which is defined as $P_d^i=[P_d^i(1), ..., p_d^i(L_a)]$; i=1, ..., $L_d$.

Similarly, $p_1^i(k)$ and $p_2^i(k)$ are samples from the pilot signal temporal signatures, which are defined as: $P_1^i=[P_1^i(1), ..., p_1^i(L_a)]$; i=1, ..., $L_{p1}$ and $P_2^i=[P_2^i(1), ..., p_2^i(L_a)]$; i=1, ..., $L_{p2}$. The temporal signatures $p_d^i$, $p_1^i$ and $p_2^i$ waveforms that last $L_a$ symbol intervals and are mutually orthogonal to each other, i.e., $$\sum_{k=1}^{L_a} [(p_x^i(k))^* p_y^j(k)] = \delta_{ij}\delta_{xy} \ \forall \ i, j \text{ and } x, y \in \{1, 2, d\}.$$

For a TDMA system, each temporal signature represents one particular time slot in the transmission frame. In addition, the data sequence c and training sequence p allocate the same amount of time slots for the two pilot signals, i.e., $L_{p1}=L_{p2}$ and $L_a=L_d+L_{p1}$. For a CDMA system, each temporal signature represents a unique spreading sequence spanning all $L_a$ symbol intervals. In this case, $L_a=L_d+L_{p1}+L_{p2}$.

In the illustrated embodiment, we adopt a block Rayleigh fading model. The channel path gains are assumed to be constant during the $L_a$ symbol intervals. At the $m^{th}$ step of the round robin algorithm, the $k^{th}$ symbol at the receiver is given by $$y(k) = \sum_{j=1, j \neq m}^{NM} h_j w_j c(k) + h_m w_m p(k) + n(k)$$

$$= n(k) + \frac{1}{\sqrt{M}} \left[ \sum_{j=1}^{NM} h_j w_j \sum_{i=1}^{L_d} A_d t_d^i p_d^i(k) + \sum_{j=1, j \neq m}^{NM} h_j w_j \sum_{i=1}^{L_{p1}} A_{p1} t_{p1}^i p_1^i(k) + h_m w_m \sum_{i=1}^{L_{p2}} A_{p2} t_{p2}^i p_2^i(k) \right]$$

for $1 \leq k \leq L_a$. The path gain $h_j$ satisfies $\text{cov}(h_i, h_j)=\sigma_h^2 \delta^{ij}$, for all ij, and n(k) represents the zero-mean white complex Gaussian noise with $\text{cov}(n(i), n(j))=\sigma^2 \delta_{ij}$, for all ij.

Based on the orthogonality of the temporal signatures, we can calculate two effective channel path gains following a similar scheme in D. Samardzija and N. Mandayam, "Pilot-assisted estimation of mimo fading channel response and achievable data rates," IEEE Trans. Signal Processing, vol. 51, no. 11, pp. 2882-2890, November. 2003:

$$h_{eq1} = \frac{\sum_{i=1}^{L_{p1}} \sum_{k=1}^{L_a} (t_{p1}^i p_1^i(k))^* y(k)}{A_{p1} L_{p1}} \quad (3)$$

$$= \frac{1}{\sqrt{M}} \left( \sum_{j=1, j \neq m}^{NM} h_j w_j \right) + h_{err1},$$

and

-continued $$h_{eq2} = \frac{\sum_{i=1}^{L_{p2}} \sum_{k=1}^{L_a} (t_{p2}^i p_2^i(k))^* y(k)}{A_{p2} L_{p2}} \quad (4)$$

$$= \frac{1}{\sqrt{M}} h_m w_m + h_{err2},$$

where the estimation errors $h_{err1}$ and $h_{err2}$ satisfy $h_{err1} \approx N(0, \sigma^2/(L_{p1} A_{p1}^2))$ and $h_{err2} \approx N(0, \sigma^2/(L_{p2} A_{p2}^2))$. Based on the channel estimation results, we obtain the equivalent channel model for the $i_{th}$ ($1 \leq i \leq L_d$) data bearing symbol:

$$\hat{y}_d^i = \frac{\sum_{k=1}^{L_a} (p_d^i(k))^* y(k)}{A_d} \quad (5)$$

$$= (h_{eq1} + h_{eq2}) t_d^i + \hat{n},$$

where $\hat{n} = \frac{\sum_{k=1}^{L_a} n(k)(p_d^i(k))^*}{A_d} - (h_{err1} + h_{err2}) t_d^k$ is the equivalent channel noise, which can be modeled as $$\hat{n} \sim N\left(0, \frac{\sigma^2}{A_d^2}, \frac{\sigma^2}{L_{p1} A_{p1}^2}, \frac{\sigma^2}{L_{p2} A_{p2}^2}\right).$$

The transmitted signal can be decoded using the simple estimation $\hat{t}_d^i = y_d^i/(h_{eq1} = h_{eq2}) \hat{t}_d^i = y_d^i/ (h_{eq1} = h_{eq2})$. Finally, the overall system SNR is given by $$SNR = \frac{\frac{1}{M} E\left(\left|\sum_{i=1}^{NM} h_i w_i\right|^2\right) + \frac{\sigma^2}{L_{p1} A_{p1}^2} + \frac{\sigma^2}{L_{p2} A_{p2}^2}}{\frac{\sigma^2}{A_d^2} + \frac{\sigma^2}{L_{p1} A_{p1}^2} + \frac{\sigma^2}{L_{p2} A_{p2}^2}}. \quad (6)$$

Consider now transmit beamforming for time varying Rayleigh fading channel. With the estimation result above, the phase shifters 18 in the transmitter 12 can be reconfigured for transmit beamforming. Through maximization of the receive SNR in equation (6), we obtain the optimal phase shifter setting as:

$$w_{opt} = \arg \max_{w_m = e^{j2\pi g_m/2^G}, 0 \leq g_m < 2^G} \left|\sum_{m=1}^{NM} h_m w_m\right|^2 \quad (7)$$

This optimization problem can be solved using the CPT algorithm described in A. Hottinen, O. Tirkkonen, and R. Wichman, Multi-antenna transceiver techniques for 3G and beyond, New York: Wiley, 2003 and A. Narula, M. Lopez, M. Trott, and G. Wornell, "Efficient use of side information in multiple-antenna data transmission over fading channels," IEEE J. Select. Areas Commun., vol. 16, no. 8, pp. 1423-1436, Oct. 1998. The solution is:

$$\hat{w}_m = \overline{w}_m e^{\frac{-j\overline{g}_m}{2^G}} \quad (8)$$

where $\overline{g}_m$ denotes the quantized relative channel phase at the $m^{th}$ step of the training:

$$\overline{g}_m = \arg \min_{0 \leq g < 2^G} \left(\left| L\left(\frac{\overline{w}_m h_m}{h_1}\right) - \frac{2\pi g}{2^G} \right|\right) \text{ for } m \geq 2. \quad (9)$$

The parameters $\overline{w}_m$ and $\hat{w}_m$ represent the setting of the $m^{th}$ phase shifter 18 before and after the reconfiguration, respectively. Similar to the estimation algorithm, the CPT is also carried out in a round robin fashion. At the first step of the training, the receiver estimates the path gain $h_1$. Subsequently, at the $m^{th}$ step of the training, the parameter $h_m w_m$ is obtained using equation (4). The quantized relative channel phase $\overline{g}_m$ is determined using equation (9) and is sent back to the transmitter 12 using G binary bits. At the transmitter 12, the $m^{th}$ phase shifter 18 is reconfigured from $\overline{w}_m$ into $\hat{w}_m$ based on equation (8).

A major concern with the above feedback scheme is the configuration latency from the round robin algorithm. At each step of the training, only one phase shifter 18 is reconfigured, and the rest of the LAA system 12 stays unchanged until the next training period. The overall configuration latency is $T N M L_a$ for the whole LAA system 12, where T is the symbol interval. In the practical wireless system, the channel always experiences time-selective fading. The impact of configuration delay has to be addressed. In the illustrated embodiment, we assume that time-varying MISO channel can be described using a first order autoregressive (AR1) model as described in R. Clarke, "A statistical theory of mobile radio reception," Bell Syst. Tech. J., vol. 47, pp. 957-1000, July 1998

$$h_m(t+kTL_a) = \rho(k) h_m(t) + \alpha_h. \quad (10)$$

where $h_m(t)$ denotes the channel path gain for the $M^{th}$ transmit antenna at time t, $$\rho(k) = J_0\left(\frac{2\pi k T L_a \upsilon}{\lambda}\right), \quad (11)$$

$\upsilon$ is the mobile speed, $\lambda$ is the carrier wavelength, and $\alpha_h$ is a independent complex Gaussian random variable, such that $\alpha_h \approx N(O, \sigma^2_h(1-\rho(k)^2))$. The configuration latency is proportional to the training period $\tau = L_a T$. A smaller $\tau$ renders small delay, and hence larger beamforming gain. However, the current fabrication technology limits the maximum switching speed of the RF switches 24 in the LAA system 12. Furthermore, a short training period will also increase estimation error. Thus, the parameter $\tau$ should be carefully defined for optimal performance. Based on equations (6), (10) and the fact that the channel path gains $h_m(t)$, m=1, . . . , NM are mutually independent of each other, we calculate the system SNR as a function of $\tau$. Through a series of derivation, it can be shown that the system SNR at the $m^{th}$ step of the round robin algorithm is given by:

$$SNR(m) = \frac{\frac{\sum_{i=1}^{NM}\sum_{k=1}^{NM}\beta_{im}\beta_{km}\gamma_{ik}}{M} + \frac{\sigma^2}{L_{p1}A_{p1}^2} + \frac{\sigma^2}{L_{p2}A_{p2}^2}}{\frac{\sigma^2}{A_d^2} + \frac{\sigma^2}{L_{p1}A_{p1}^2} + \frac{\sigma^2}{L_{p2}A_{p2}^2}}, \quad (12)$$

where $$\beta_{im} = \begin{cases} \rho(m-i) & \text{if } m \geq i, \\ \rho(NM+m-i) & \text{otherwise.} \end{cases}$$

and $$\gamma_{ik} \triangleq \begin{cases} \sigma_h^2 & \text{if } i = k, \\ \frac{\Gamma^2(1.5) 2^G \sin\frac{\pi}{2G}}{\pi}\sigma_h^2 & \text{if } i \neq k \text{ and } i = 1 \text{ or } k = 1, \\ \frac{\Gamma^2(1.5) 2^{2G} \sin^2\frac{\pi}{2G}}{\pi^2}\sigma_h^2 & \text{if } i \neq k \text{ and } i \neq 1 \text{ and } k \neq 1. \end{cases}$$

For a simplified scenario, where the ratios $L_{p1}/L_a$ and $L_{p2}/L_a$ take a fixed value, the optimal training duration $L_a$ can be obtained as follows by maximization of the worst-case system SNR:

$$L_{a\_opt} = \underset{\forall L_a}{\arg\max} \underset{\forall m}{\min} SNR(m) \quad (13)$$

To reduce implementation complexity, the optimal values of $L_a$ can be calculated in advance for different mobile speed, and the results should be stored in a database. The mobile station only needs to monitor the mobile Doppler frequency and determine the corresponding value of $L_a$. Since the proposed algorithm takes the time-varying nature of the fading channel into consideration, this algorithm is suitable for a wide variety of time-varying wireless communication scenarios.

Figure 4:
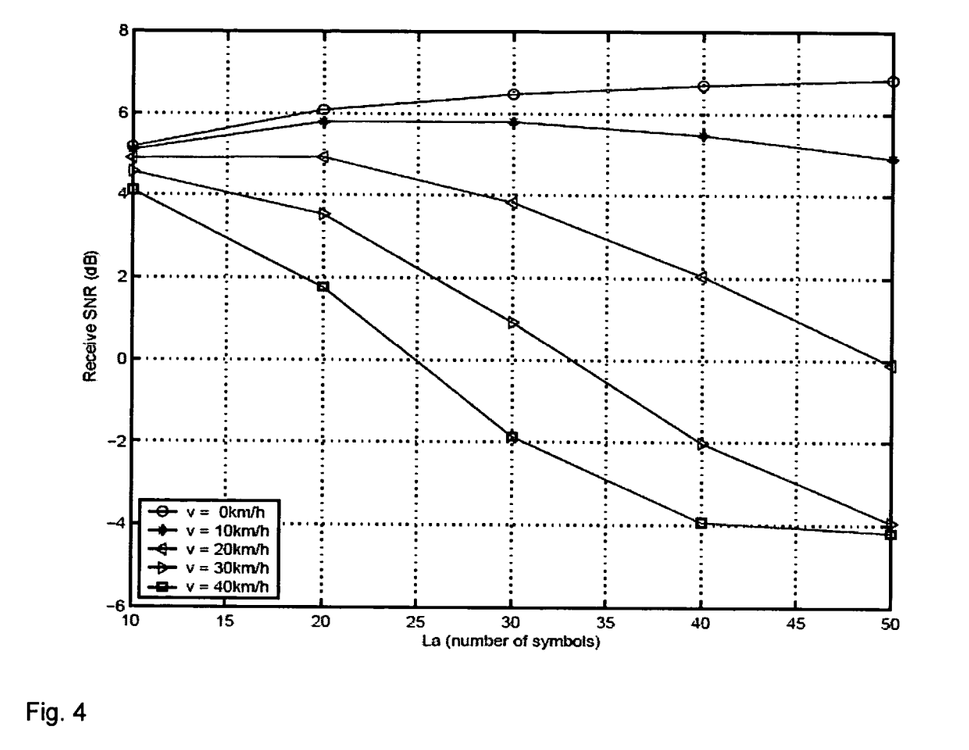
FIG. 4 is a graph of the receiver SNR as a function of symbol length used in training plotted for various speed of the mobile station relative to the fixed station.

Consider now numerical simulations of the illustrated embodiment. We use a series of numerical simulations to examine the performance of the proposed reconfigurable array transmission system 12. In the first experiment, we investigate the impact of training latency on the system performance. We calculate the system SNR as a function of mobile speed using equation (12). The results are summarized in FIG. 4. In this experiment, we adopt some basic MIMO system parameters from A. Naguib, V. Tarokh, N. Seshadri, and A. Calderbank, "A space-time coding modem for high-data-rate wireless communications," IEEE J. Select. Areas Commun., vol. 16, no. 8, pp. 1459-1478, October 1998. [9] P. Dent, G. Bottomley, and T. Croft, "Jakes fading model revisited," IEEE Electronics Letters, vol. 29, no. 13, pp. 1162-1163, June, 1993. The symbol rate is 24300 symbols/s, the carrier frequency is 1.9 GHz, and the ratio between the number of pilot symbols and data symbols is set to be $L_{p1}/L_a = L_{p2}/L_a = 0.2$. The other parameters are set to be N=1; M=8; G=2; $\sigma^2_{h=o^2}=1$; and $A_d = A_{p1} = A_{p2} = 1$. In FIG. 4, it is shown that when the mobile speed is 0 km/h, the receive SNR increases as $L_a$ increases. This is because a larger training interval will reduce the channel estimation error.

However, as the mobile speed increases, the optimal $L_a$ decreases accordingly. It is seen that at v>20km/h, the optimal $L_a$ is only 10 symbols, and the impact of training latency is significant. Note that $L_a=10$ is the shortest possible training interval since 20% of $L_a$ is reserved for training purposes and one need at least 2 training symbols for the channel estimation scheme in equations (3) and (4). Comparing to the static fading case, the high mobile speed incurred more than 2 dB performance degradation.

Figure 5:
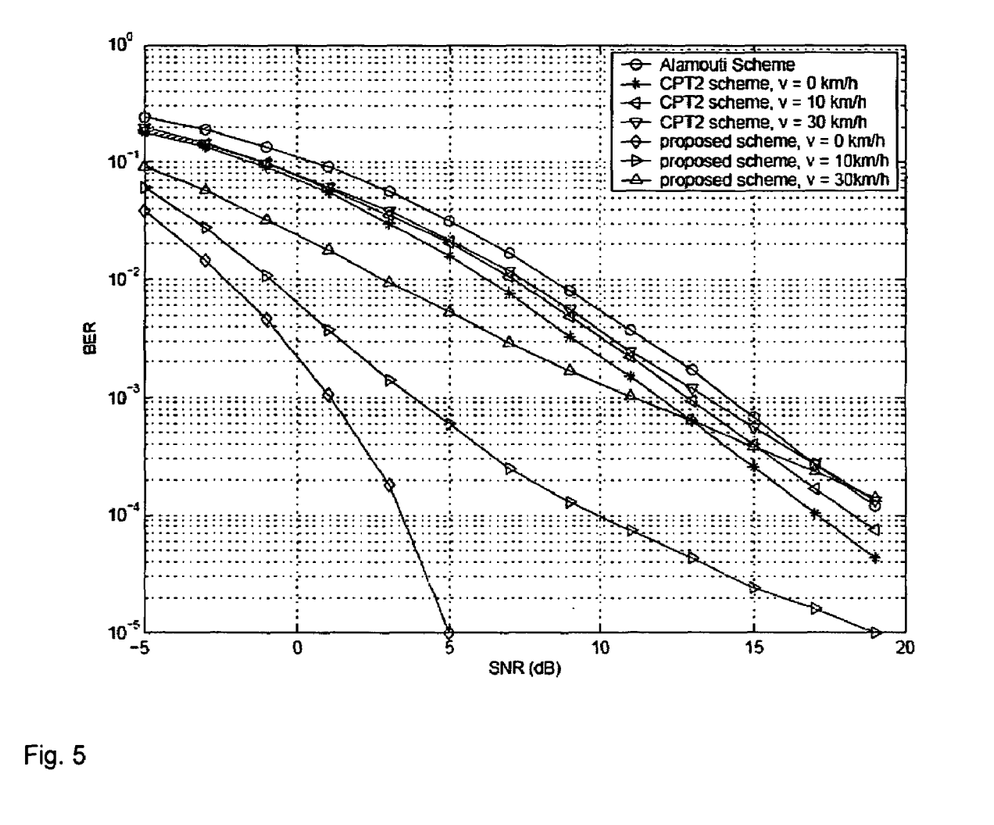
FIG. 5 is a graph of the bit error rate as a function of the SNR for various wireless communication schemes or protocols of the prior art as compared to the performance of the illustrated embodiment.

We then compare the performance or the bit error rate (BER) to the signal to noise ratio (SNR) of several widely used space-time transmission schemes in FIG. 5. For our illustrated scheme, the system parameters are the same as the previous experiment in FIG. 4. In addition, we include the Alamouti codes described in S. Alamouti, "A simple transmit diversity scheme for wireless communications," IEEE J. Select. Areas Commun., vol. 16, no. 8, pp. 1451-1458, October 1998 as an open loop algorithm, and the standard CPT algorithm from A. Hottinen, O. Tirkkonen, and R. Wichman, Multi-antenna transceiver techniques for 3G and beyond, New York: Wiley, 2003 as a close loop algorithm for comparison. The standard CPT scheme is defined for two transmit antennas 14 and uses two feedback bits, hence it is referred to as CPT2. In CPT2, two RF chains 10 are employed for real time channel estimation, and the configuration delay is simply $L_a T$. Overall, the comparison is fair since all the schemes in the simulation employ two RF chains 10. A Jakes' fading model as described in P. Dent, G. Bottomley, and T. Croft, "Jakes fading model revisited," IEEE Electronics Letters, vol. 29, no. 13, pp. 1162-1163, June, 1993 is used to generate the time varying channel at each $L_a$ symbol interval.

The BER-SNR curves for BPSK constellation are depicted in FIG. 5. Note that in FIG. 5, the transmit powers are properly scaled for the different schemes such that they all equal to the transmit power of the Alamouti scheme, and the system SNR is defined as the receive SNR of the Alamouti scheme. As can be seen, the illustrated algorithm out performs the Alamouti scheme as well as the CPT2 scheme. The performance gain is especially large at low mobile speed. For example, at v=0 km/h, about 10 dB SNR advantage is observed from the proposed scheme when compared to the Alamouti scheme or the CPT2 scheme, while the system complexity of these schemes are nearly the same.

In summary, we have disclosed a MISO architecture based on a reconfigurable LAA system 12. The implementation complexity of the proposed system is much less than conventional MISO systems. Meanwhile, a simple round robin pilot assisted estimation algorithm relieves the mobile station from heavy duty of real time channel estimation. The receiver only needs to track two equivalent channels yet it enjoys the high SNR offered from a large MISO system. We also presented a transmit beamforming scheme as well as its SNR analysis based on an AR1 time-varying fading model, and we derived the optimal training duration for different mobile speeds. Numerical simulations show that the proposed scheme enjoys superior performance for various kinds of time varying Rayleigh fading channels.

One of the problems thus overcome is the reduction of the cost, power consumption, and implementation complexity for the TDMA and CDMA wireless systems. These are accomplished in the illustrated embodiment by using a reconfigurable antenna array, together with a round robin channel estimation and transmit beam forming algorithm.

Thus, it is the purpose illustrated embodiment of the system to improve the reliability, flexibility, and performance (in terms of SNR, bit error, or capacity) in the wireless communication systems with a much simpler implementation, lower cost, and lower power consumption.

The fundamental principle is to use a reconfigurable antenna array structure. Based on a round robin channel estimation and transmit beam forming algorithm, the antenna array is adjusted adaptively such that the transmitted signal better fits the channel reality. The major advantage of this invention is that we use a simple low cost architecture to realize the high channel capacity from a large antenna array. The illustrated embodiment of the system has the following advantages or features:

Overall, our design is general enough to be used for any number of transmit antennas, any number of feedback bits, and any fading speeds. Also, it is suitable for both open-loop and closed-loop systems.

Both the transmitter and receiver enjoy simple implementation, low power consumption, and low cost.

The performance of the proposed system is comparable to that of an equivalent MIMO system, which employs a much larger number of RF chains.

This invention can be used for the existing and next generation wireless communications systems. It can be adopted for any TDMA and CDMA wireless systems with multiple transmit antennas. This invention can also be used for the existing and next generation wireless communication systems. It can be adopted for any TDMA and CDMA wireless systems with multiple transmit antennas. For example, it can be used in IEEE 802.11b WiFi system or the WCDMA systems. Also, it can be adopted by the next generation of these standards, for example IEEE 802.11n, 4G, and the like. Another major area of application is the communication systems in the defense industry.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A multiple antenna wireless system including a transmitter and a receiver comprising:
    a reconfigurable large antenna array having a plurality of antennas;
    a plurality of RF chains in the transmitter coupled to the reconfigurable large antenna array;
    a pilot assisted channel estimation means for tracking of a fading channel; and
    an adaptive transmit beamforming means at the transmitter for beamforming the reconfigurable large antenna array, where the receiver measures performance of the fading channel, generates relative channel phase information, and feeds back the relative channel phase information to the transmitter, the system further comprises a plurality of RF phase shifters coupled to the large antenna array, the RF phase shifters being adjusted to perform co-phase transmission (CPT) using the relative channel phase information fed back from the receiver.

2. The system of claim 1 further comprising a plurality of RF switches for selectively coupling either a data signal to be transmitted or a piloting training signal to be transmitted to each of the antennas in the large antenna array.

3. The system of claim 2 further comprising a plurality of impedance matching circuits selectively coupled to each of the antennas in the large antenna array to provide impedance matching as different RF chains are selectively coupled to the antennas.

4. The system of claim 2 where the system is operated in an open loop mode where there is no channel state information available at the transmitter, where the receiver generates STCs to provide spatial diversity to compensate for channel fading, where the RF switches are configured into a predetermined corresponding position for each RF chain and where all of the phase shifters are configured into a fixed position so that all antennas coupled to RF chains driven in parallel operate as a single combined antenna with respect to channel path gain.

5. The system of claim 2 where the system is operated in a closed loop mode, where there is channel state information available at the transmitter from the receiver, where the phase shifters coupled to each RF chain are adaptively configured in a round robin fashion in that the RF switches are reconfigured such that a pilot training sequence is directed to a selected one of the antennas in the large antenna array in sequence until the corresponding channels for each of the antennas has been trained, the receiver calculating two effective channel path gains for each antenna without interrupting ongoing data communication, and feeding back channel phase information to the transmitter to reconfigure the phase shifter corresponding to the antenna being trained.

6. The system of claim 5 further comprising a baseband modulator coupled in sequence to each of the antennas of the large antenna array to provide a pilot training signal in sequence to each antenna as controlled by a selected configuration of the plurality of RF switches with the other ones of the antennas being coupled to a data signal, the receiver generating relative channel phase information between the antenna being trained and a first antenna trained, the receiver sending the relative channel phase information back to the transmitter for each antenna as it is trained, the phase shifter corresponding to the trained antenna being adjusted to attain maximum signal-to-noise ratio (SNR) at the trained antenna.

7. A method for multiple antenna wireless communication comprising:
tracking a plurality of fading channels in a reconfigurable large antenna array having a plurality of antennas using pilot assisted channel estimation to selectively couple a plurality of RF chains in the transmitter to the reconfigurable large antenna array by estimating channel phase information; and
adaptively, transmit beamforming the reconfigurable large antenna array by using the channel phase information to adjust transmitter parameters to increase performance of the wireless systems,
wherein the system is operated in a closed loop mode, and where adaptively, round-robin transmit beamforming comprises coupling a baseband modulator coupled in sequence to each of the antennas of the large antenna array to provide the pilot training signal in sequence to each antenna as controlled by a selected configuration of a plurality of RF switches with the other ones of the antennas being coupled to a data signal, generating relative channel phase information between the antenna being trained and a first antenna trained, sending the relative channel phase information back for each antenna as it is trained, adjusting a phase shifter corresponding to the trained antenna to attain maximum signal-to-noise ratio (SNR) at the trained antenna.

8. The method of claim 7 where tracking of the fading channels and transmit beamforming are performed at an optimal training duration for a given mobile speed of the receiver.

9. A method for multiple antenna wireless communication comprising:
tracking a plurality of fading channels in a reconfigurable large antenna array having a plurality of antennas using pilot assisted channel estimation to selectively couple a plurality of RF chains in the transmitter to the reconfigurable large antenna array; and
adaptively, transmit beamforming the reconfigurable large antenna array,
where adaptively, transmit beamforming comprises measuring performance of the fading channel, generating relative channel phase information, and feeding back the relative channel phase information, adjusting a plurality of RF phase shifters coupled to the large antenna array to perform co-phase transmission (OPT) using the relative channel phase information fed back.

10. A method for multiple antenna wireless communication comprising:
tracking a plurality of fading channels in a reconfigurable large antenna array having a plurality of antennas using pilot assisted round robin channel estimation to selectively couple a plurality of RF chains in the transmitter to the reconfigurable large antenna array; and
adaptively, round-robin transmit beamforming the reconfigurable large antenna array,
where adaptively, round-robin transmit beamforming the reconfigurable large antenna array comprises transmit beamforming in an open loop mode where there is no channel state information available using STCs to provide spatial diversity to compensate for channel fading, where all but one of the antennas are coupled to a corresponding RF chain and operate as a single combined antenna with respect to channel path gain, the one antenna operating to track the plurality of fading channels.

11. A method for multiple antenna wireless communication comprising:
tracking a plurality of fading channels in a reconfigurable large antenna array having a plurality of antennas using pilot assisted round robin channel estimation to selectively couple a plurality of RF chains in the transmitter to the reconfigurable large antenna array; and
adaptively, round-robin transmit beamforming the reconfigurable large antenna array,
where the system is operated in a closed loop mode, where there is channel state information available, where adaptively, round-robin transmit beamforming comprises directing a pilot training signal to a selected one of the antennas in the large antenna array in sequence until the corresponding channels for each of the antennas has been trained in a round robin fashion, and feeding back channel phase information to reconfigure the corresponding antenna being trained in a round robin fashion.

* * * * *